United States Patent [19]

Shiurila et al.

[11] 4,400,102
[45] Aug. 23, 1983

[54] MULTI-COLOR PRINT HEAD

[75] Inventors: John Shiurila, Londonderry; Richard A. Williams, Hampstead, both of N.H.

[73] Assignee: Centronics Data Computer Corp., Hudson, N.H.

[21] Appl. No.: 206,553

[22] Filed: Nov. 13, 1980

[51] Int. Cl.³ .......................... B41J 3/12; B41J 27/08
[52] U.S. Cl. ................. 400/124; 101/93.05; 400/471.1
[58] Field of Search ................. 400/124, 470–471.1, 400/241–241.2; 101/93.05

[56] References Cited

U.S. PATENT DOCUMENTS

| | | | |
|---|---|---|---|
| 414,846 | 11/1889 | Smith | 197/150 |
| 2,530,697 | 11/1950 | Higgins | 197/150 |
| 3,055,297 | 9/1962 | Leeds | 400/470 X |
| 3,400,801 | 9/1968 | Swenson | 197/171 |
| 3,948,382 | 4/1976 | Nesbitt et al. | 400/124 X |
| 4,030,590 | 6/1977 | Wojdyla | 400/124 X |
| 4,079,824 | 3/1978 | Ku | 400/124 |
| 4,194,846 | 3/1980 | Zerillo | 400/124 |
| 4,210,917 | 7/1980 | Lane | 101/93.05 X |
| 4,279,519 | 7/1981 | Shiurila | 400/471.1 X |
| 4,279,521 | 7/1981 | Kightlinger | 101/93.05 X |

FOREIGN PATENT DOCUMENTS

| | | | |
|---|---|---|---|
| 2152241 | 4/1973 | Fed. Rep. of Germany | 400/124 |
| 2546835 | 4/1977 | Fed. Rep. of Germany | |
| 260872 | 4/1949 | Sweden | |

OTHER PUBLICATIONS

*IBM Tech. Disc. Bulletin,* by D. W. Skinner et al., vol. 21, No. 5, Oct., 1978, pp. 1828–1829.

*IBM Tech. Disc. Bulletin,* by J. H. Meier, vol. 21, No. 11, Apr., 1979, pp. 4448–4451.

IBM Technical Disclosure Bulletin, vol. 14, No. 9, (Feb. 1972), p. 285, "Self-Inking Print Wires", by J. E. Lisinski and R. Cross.

IBM Technical Disclosure Bulletin, vol. 14, No. 10, (Mar. 1972), p. 2980, "Print Wire Inking System", by J. E. Lisinski.

IBM Technical Disclosure Bulletin, vol. 18, No. 9, (Feb. 1976), p. 2761, "Magnetic Method of Inking Print Wires", by D. P. Darwin and J. E. Lisinski.

*Primary Examiner*—Paul T. Sewell
*Attorney, Agent, or Firm*—Kenway & Jenney

[57] ABSTRACT

A dot matrix impact printer for printing a plurality of colors substantially simultaneously. A print head is comprised of three spaced substantially parallel columns of print wires, each column containing an equal number of print wires. Separate independent ink supply sources are provided immediately adjacent the print head, and ink delivery means carry the ink from an associated supply source to the printing tips of the print wires in an associated column. Each of the ink supply containers contain an ink of a different color. The colors may, for example, be the three primary colors. The ink delivery means incorporate capillary means for delivering ink from the ink supply container to the printing tips by capillary action. Printing dots of different colors in either a partially or a substantially overlapping fashion enables any color to be created from the three primary colors. The ink delivery means may deliver ink to the print wires at a location inwardly from the printing tips or may deliver the ink directly to the printing tips. The technique of ink delivery may also be utilized in shuttle printers of the dot matrix type.

3 Claims, 50 Drawing Figures

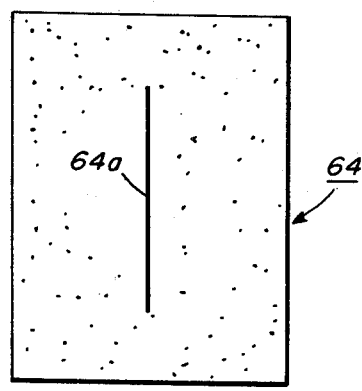
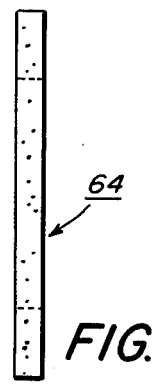
FIG. 4a
FIG. 4b
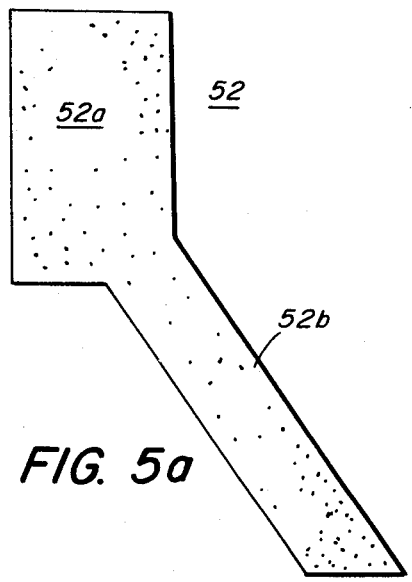
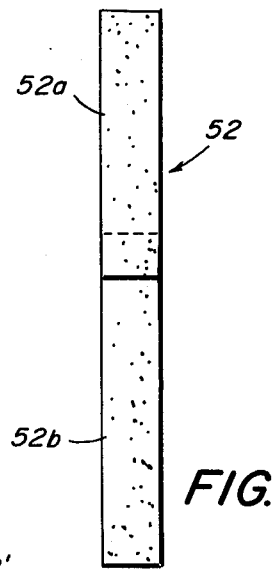
FIG. 5a
FIG. 5b
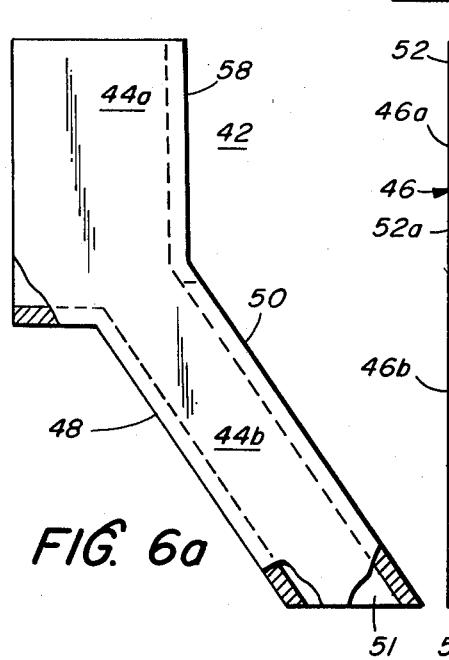
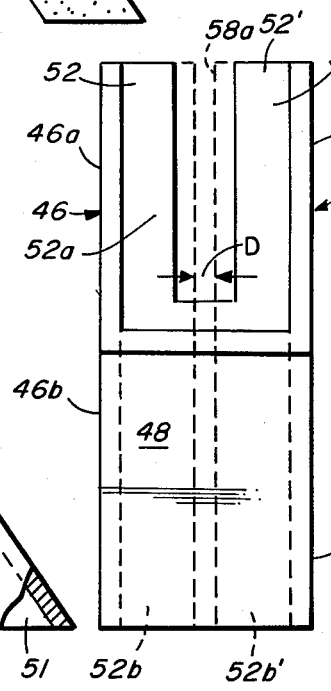
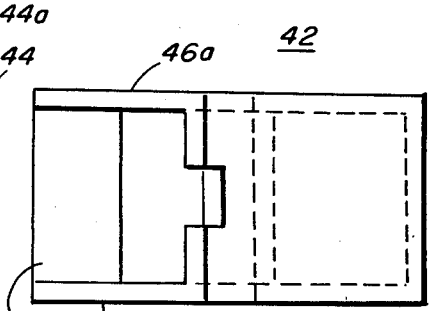
FIG. 6a
FIG. 6b
FIG. 6c

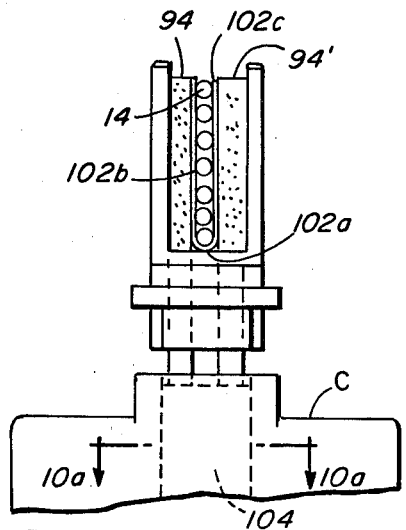
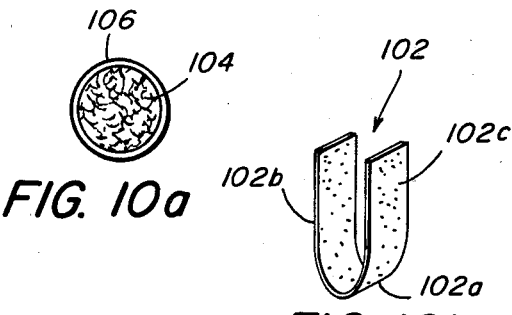
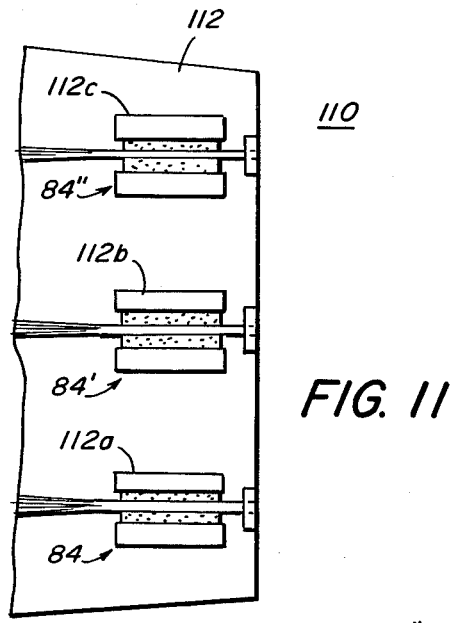
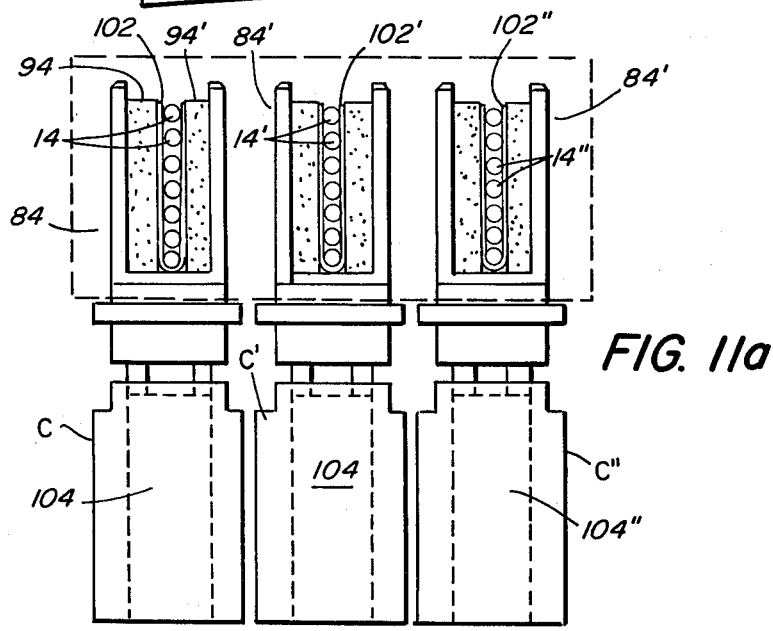

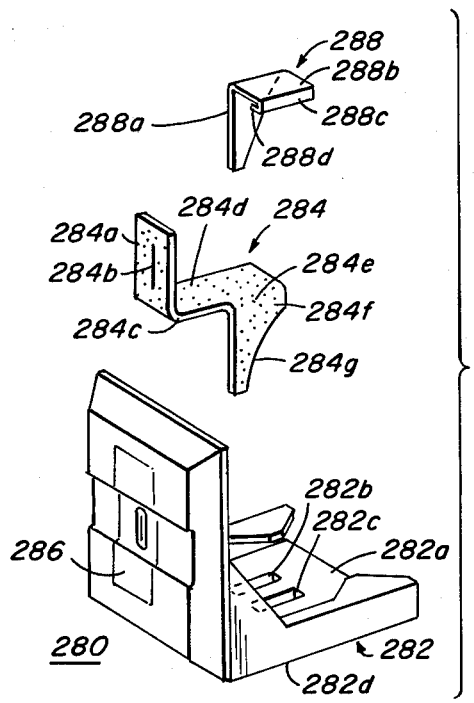
FIG. 16
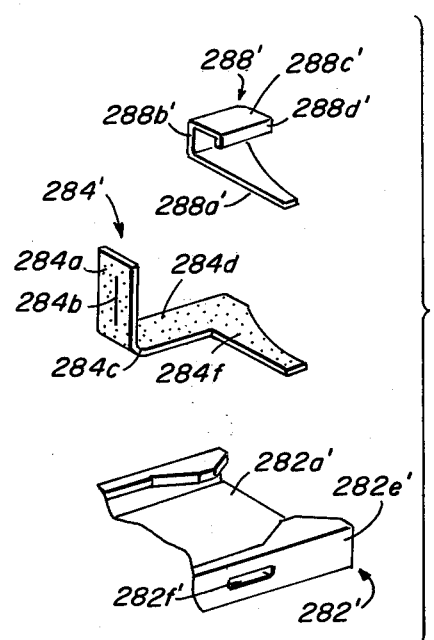
FIG. 17a
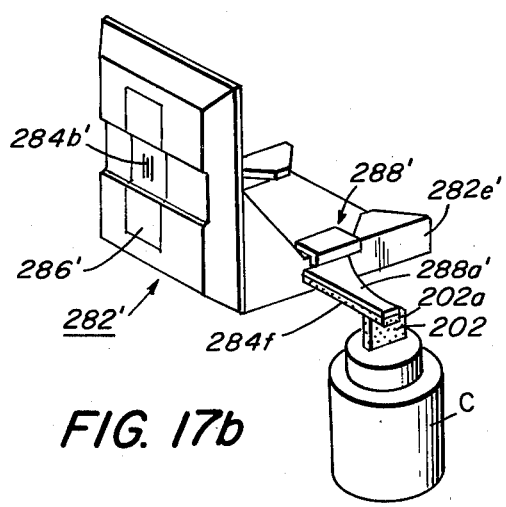
FIG. 17b
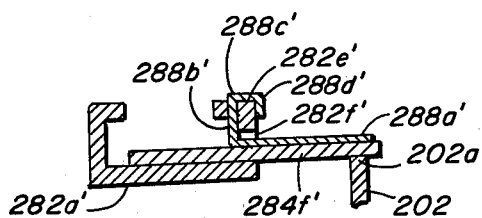
FIG. 17c
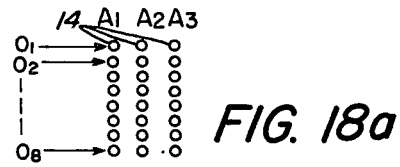
FIG. 18a
FIG. 18b
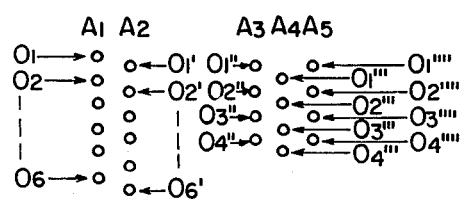
FIG. 18c

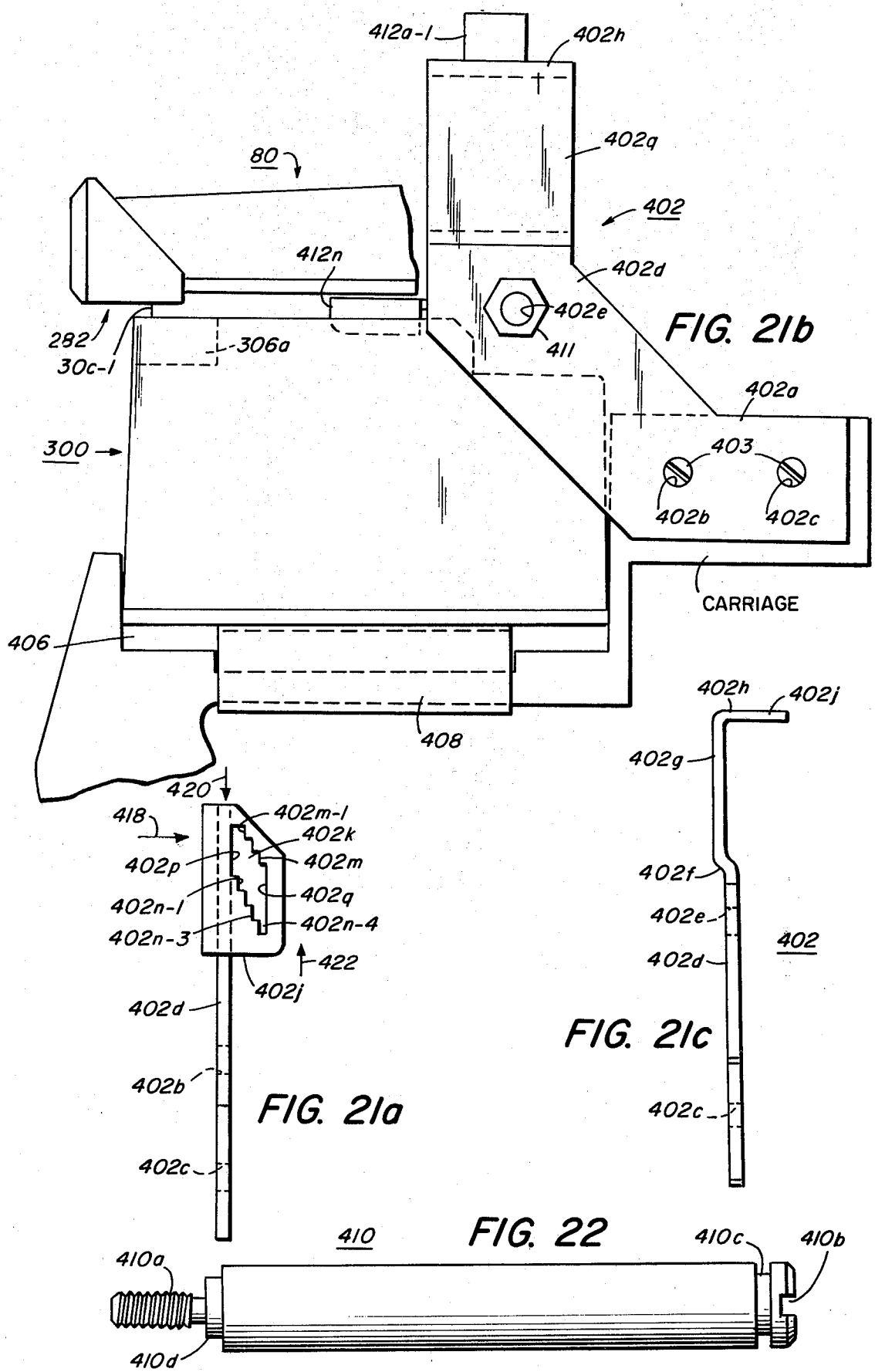

MULTI-COLOR PRINT HEAD

FIELD OF THE INVENTION

The present invention relates to impact printers and more particularly to impact printers of the dot matrix type capable of printing a plurality of colors while eliminating the need for conventional inked ribbons.

BACKGROUND OF THE INVENTION

Dot matrix impact printers find widespread use in a variety of different applications. For example, dot matrix impact printers are utilized to provide hard copy outputs for computers, point of sale cash registers, communication links, and printer-plotters, to name just a few. Conventional dot matrix impact printers utilize an elongated ribbon, a portion of which is positioned across the printing region. The printing wires of the print head are activated and impact the ribbon, driving it against a paper web and causing ink dots in the form of the cross-section of the printing tip to be transferred to the paper web. Printing in a plurality of colors requires the provision of a ribbon having portions saturated with each color. The position of the ribbon is shifted to place the proper color in alignment with the printing wires, making it impossible to print a plurality of colors simultaneously. In the event that it is desired to print different colors, the ribbon must be shifted each time a different color is to be printed, significantly reducing the printing speed. Ribbons of different colors are wasteful since, when the color primarily being used is exhausted, the entire ribbon must be replaced.

The assignee of the present application has developed a "ribbonless" printer as disclosed in U.S. Pat. No. 4,194,846 issued Mar. 26, 1980 to the present assignee, in which means are provided for delivering ink from an ink supply container to the print wires of a dot matrix impact printer, said design utilizing the principles of capillary action for effecting ink delivery. However, the design described in the aforementioned patent is not capable of multi-color printing.

BRIEF DESCRIPTION OF THE INVENTION

The present invention is characterized by comprising a dot matrix impact print head having a plurality of arrays of print wires arranged in spaced, preferably parallel fashion said arrays of print wires being adapted to be fired sequentially and/or simultaneously. Ink delivery means, each associated with one of said arrays, delivers ink from an associated ink supply source to its associated array, totally eliminating the need for conventional inked ribbons. The firing of print wire arrays may be timed to cause different degrees of overlapping of printed dots to produce colors in addition to those provided by the ink containers.

The delivery means comprises capillary means for delivering ink from each of the ink supply containers either to a point spaced inwardly from the printing tips or directly to capillary means positioned against the forward nose of the print head. In one embodiment in which the ink is delivered to the capillary means covering the front nose, the capillary means extends from a point adjacent the ink supply source, where it physically engages a capillary means provided within the container, directly to the forward nose of the print head. In another embodiment, capillary means is provided for delivering ink from the capillary means within the ink supply container to a point spaced rearwardly of the print wire printing tips. The ink is carried along the surface of the print wires and through a jewel bearing by capillary action to wet a capillary means arranged on the front nose of the print head, which in turn acts as an intermediate supply for ink as well as serving to wet the printing tips of the print wires with a measured amount of ink.

In still another embodiment, the ink is delivered from the capillary means within the ink supply container through capillary means on said print head to a point spaced inwardly from the printing tips whereby the ink is delivered to the printing tips through jewel bearing means, said ink flowing therethrough by capillary action.

Flow control means may be provided for each of the ink delivery means to regulate the rate of flow, and in fact prevent flow, if desired. The flow regulating means may also simultaneously control the ink flow from all containers simultaneously.

The capillary means utilized in the ink supply containers may comprise stick-like members capable of absorbing ink along its entire length in order to carry the ink by capillary action to the ink delivery means, or alternatively, may be comprised of capillary means enclosed in a non-porous sleeve and limiting ink absorption to the bottom portion thereof.

The capillary member mounted upon the head may extend downwardly or outwardly from the print head for sliding engagement with the ink container capillary member.

The print head bearing may assume a variety of patterns adapted for: color printing; black and white printing or black and white and color printing, although a standard number of print wires are preferably employed in the print head design to lend added flexibility thereto, merely by changing the jewel bearing. Adjustable means for controlling the position of one or more ink container, mounted upon that carriage assembly supporting the print head.

OBJECTS OF THE INVENTION AND BRIEF DESCRIPTION OF THE FIGURES

It is, therefore, one object of the present invention to provide a novel print head having means for printing a plurality of colors substantially simultaneously.

Still another object of the present invention is to provide a novel print means capable of printing a plurality of different colors substantially simultaneously wherein said print means is further adapted to superimpose said colors one upon the other for the creation of additional colors beyond those derived from each color source.

Still another object of the present invention is to provide print head means for printing different colors including delivery means for delivering liquid ink from ink supply sources to the printing members by capillary action.

Still another object of the present invention is to provide novel printing means of the impact type capable of printing a plurality of different colors substantially simultaneously and without imposing any reduction in normal printing speed.

Still another object of the present invention is to provide novel printing means of the impact type capable of printing a plurality of different colors substantially simultaneously and without imposing any reduction in normal printing speed wherein the array of print wires may be arranged to provide multicolor printing and alternatively single color printing.

Still another object of the present invention is to provide a novel printing means comprising a print wire assembly having a standard number of activating print wires and a jewel bearing provided to arrange the printing tips of the print wire in any one of a variety of arrays.

Still another object of the present invention is to provide a shuttle bar printer with multi-color printing capability.

Still another object of the present invention is to provide a novel assembly for positioning the ink container (or containers) on the carriage assembly and for aligning the container (or containers) relative to the print head to regulate the rate of flow of ink to the print wires.

The above, as well as other objects of the present invention will become apparent when reading the accompanying description and drawings in which:

FIG. 1b is a side elevational view of the assembly of FIG. 1a.

FIG. 1c is a bottom plan view of the assembly of FIG. 1a.

FIG. 1d shows a plan view of the capillary member employed in the assembly of FIG. 1a;

FIG. 2a shows a top plan view of the capillary member holder employed in the embodiment of FIG. 1a.

FIG. 2b shows a rear elevation view of the holder of FIG. 2a.

FIG. 2c shows a side elevational view of the holder of FIG. 2a.

FIG. 3b shows a top plan view of the embodiment of FIG. 3a.

FIG. 3c shows a side elevational view of the embodiment of FIG. 3a.

FIGS. 4a and 4b show front and side views of the capillary member employed in the embodiment of FIG. 3a.

FIG. 5a and 5b show side and front views respectively of a second capillary member employed in the embodiment of FIG. 3a;

FIGS. 6a, 6b and 6c show side, front and top plan views respectively of the holder for holding capillary members of the type shown in FIG. 5a and employed in the embodiment of FIG. 3a.

FIGS. 8a, 8b and 8c are front and side elevational views and bottom plan views, respectively, of the holder employed in the embodiment of FIG. 7a.

FIGS. 9a and 9b are front and side views respectively of the capillary members employed with the holder of FIG. 8a.

FIG. 10 shows a front elevational view of a fully assembled direct inking assembly of the type shown in FIG. 8a.

FIG. 10a shows a capillary member which is utilized in the ink supply container of FIG. 10.

FIG. 10b shows a perspective view of a wear reducing strip employed in the embodiment of FIG. 10.

FIG. 11 shows a top plan view of the nose portion of a print head incorporating a plurality of ink delivery systems of the type shown in FIG. 10.

FIG. 11a shows a front elevational view of the assembly of FIG. 11.

FIG. 15b shows a top view of the arrangement of FIG. 15a.

FIG. 16 shows an exploded perspective view of another alternative arrangement for the nose assembly of a print head.

FIGS. 17a, 17b and 17c respectively showing an exploded perspective view, an exploded assembled view and a sectional view of still another nose assembly for print heads and the like forming part of the present invention.

FIGS. 18a through 18c show jewel bearing means for providing different arrays for printing tips of said print wires.

Figure 19A:
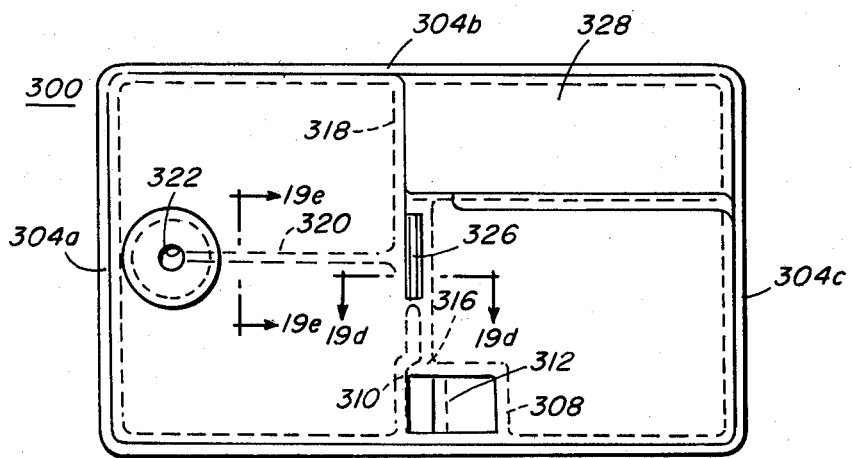
Figure 19D:
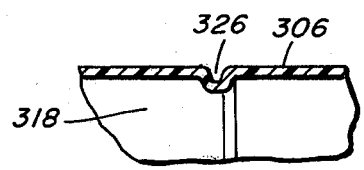
Figure 19B:
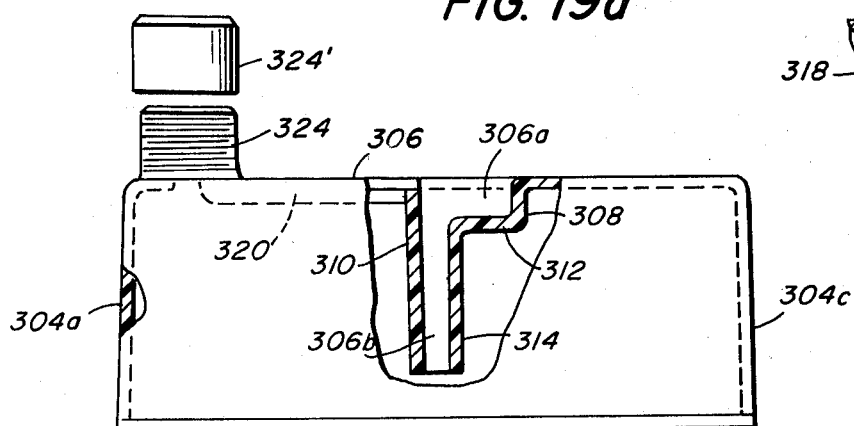
Figure 19E:
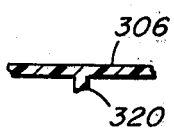
Figure 19C:
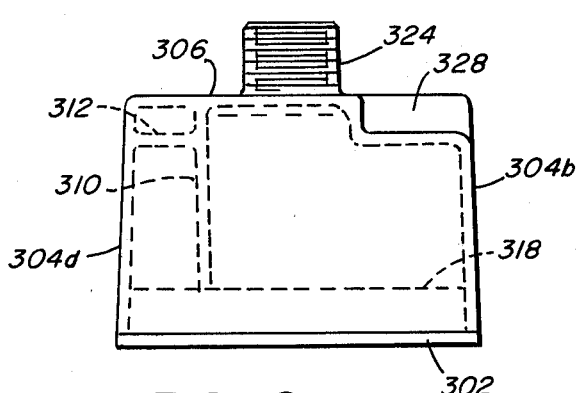

FIGS. 19a, 19b and 19c, show top, side and partial end views respectively, of an ink container.

FIG. 19d shows a sectional view looking in the direction of arrows 19d–19d' of FIG. 19a.

FIG. 19e shows a sectional view looking in the direction of arrows 19e–19e' of FIG. 19a.

Figure 20A:
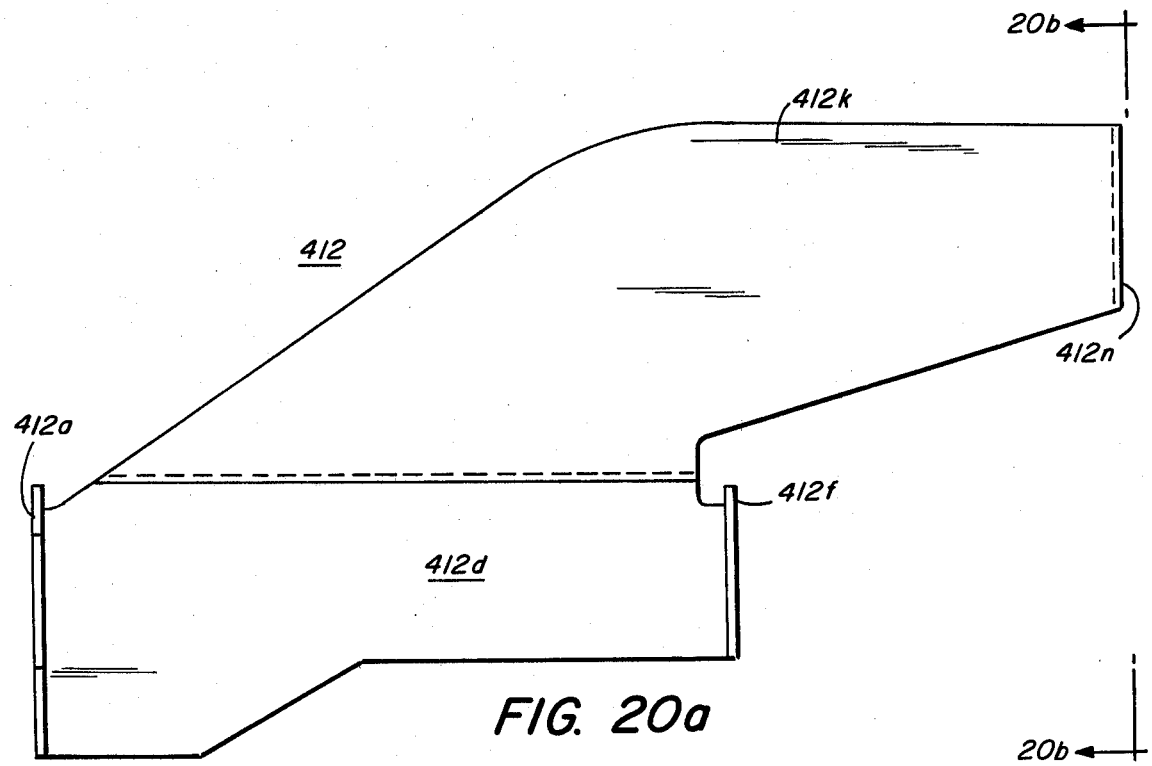
Figure 20B:
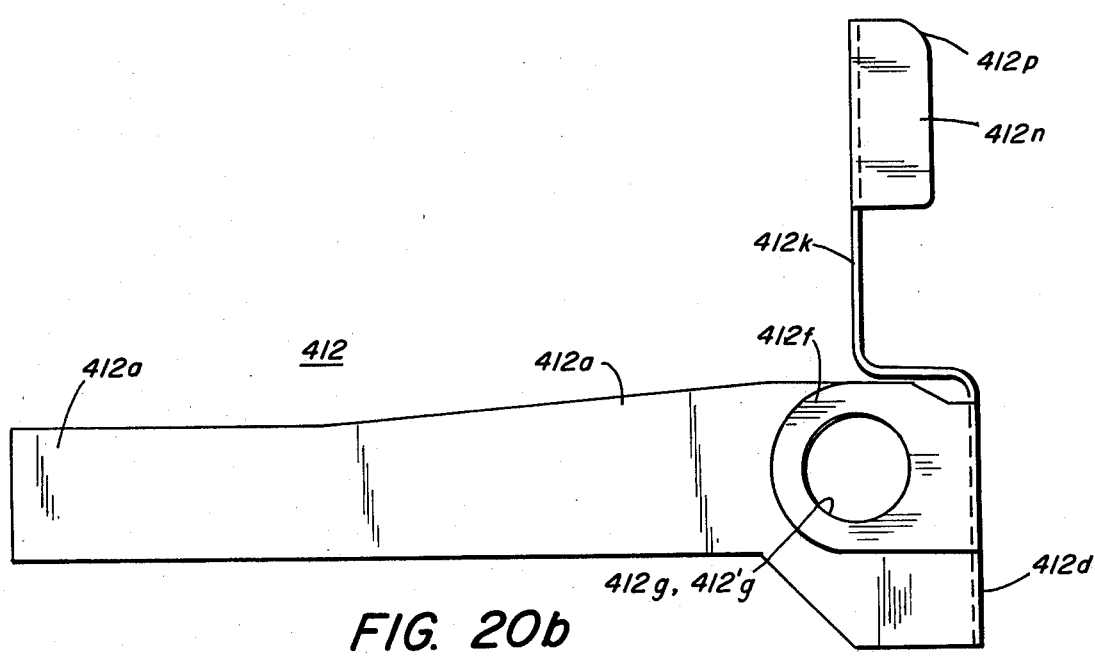
Figure 23:
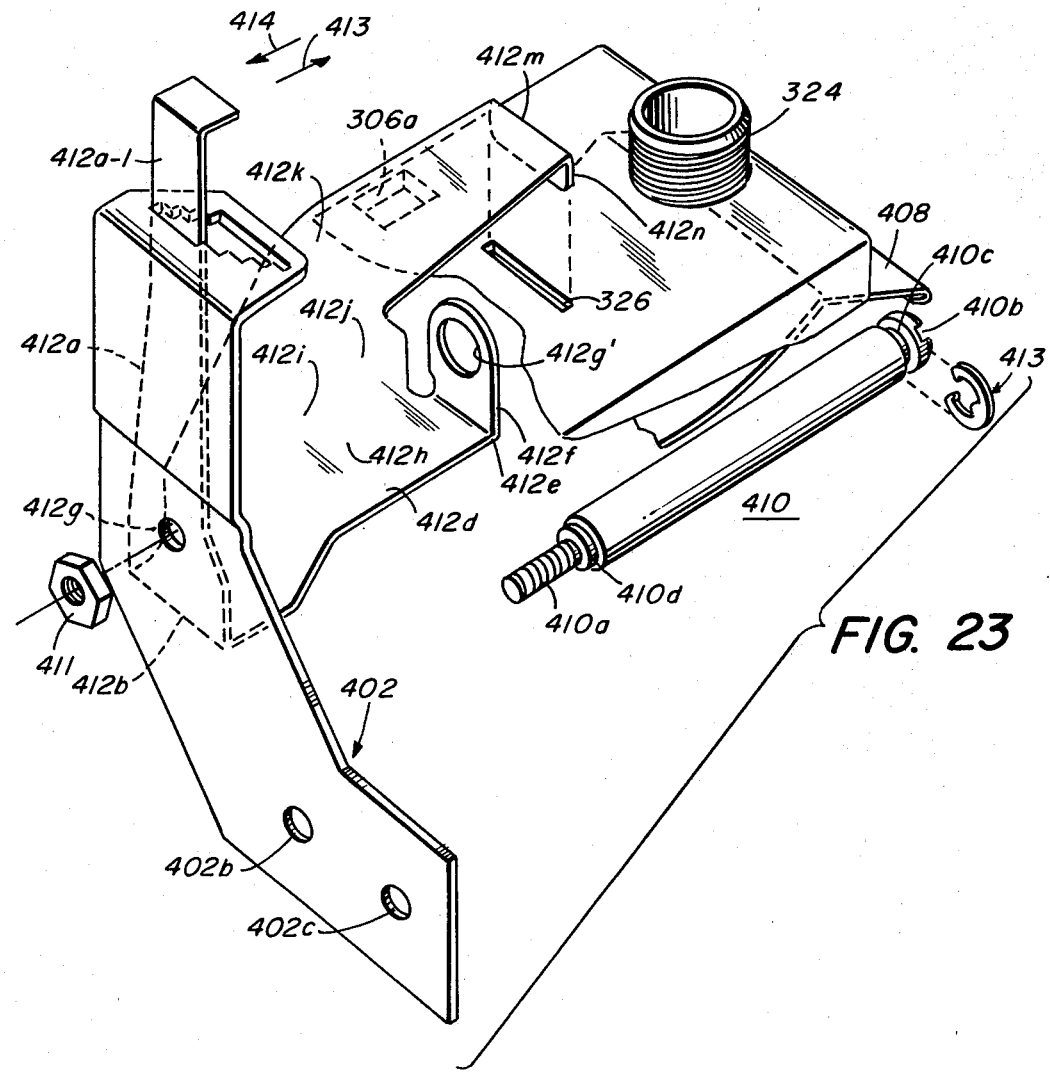

FIGS. 20a and 20b show top plan and elevational views of an operating lever employed in the assembly of FIG. 23.

FIGS. 21a, 21b and 21c show top, side and end views of the mounting bracket of the assembly of FIG. 23.

FIG. 22 shows the pin employed in the embodiment of FIG. 23.

FIG. 23 is an exploded perspective view of ink container location and positioning assembly for the container of FIGS. 19a–19c.

DETAILED DESCRIPTION OF THE FIGURES AND BEST MODE FOR CARRYING OUT THE INVENTION

Referring to FIGS. 1a through 1d and 2a through 2c there is shown one arrangement for directly supplying ink from a container to the printing elements of a single array of print wires. The embodiment 10 is comprised of a nose cone 12 of a printer, only a portion of said nose cone being shown for purposes of simplicity. A detailed description of a suitable print head having such a nose cone is described in U.S. Pat. No. 4,165,940 issued Aug. 28, 1979 and assigned to the assignee of the present invention. For purposes of understanding the present invention, it is sufficient to understand that the nose cone 12 supports a plurality of reciprocally mounted slender elongated print wires 14 which are maintained preferably in alignment along an imaginary vertical line by a jewel bearing 16.

Figure 2A:
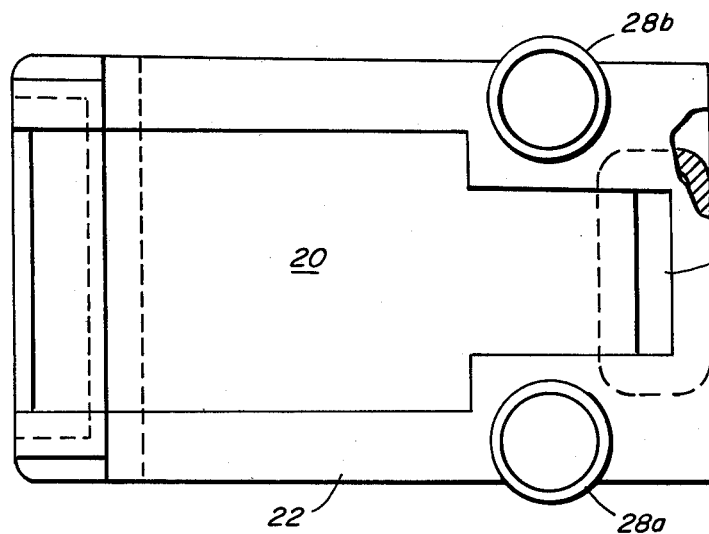
Figure 2B:
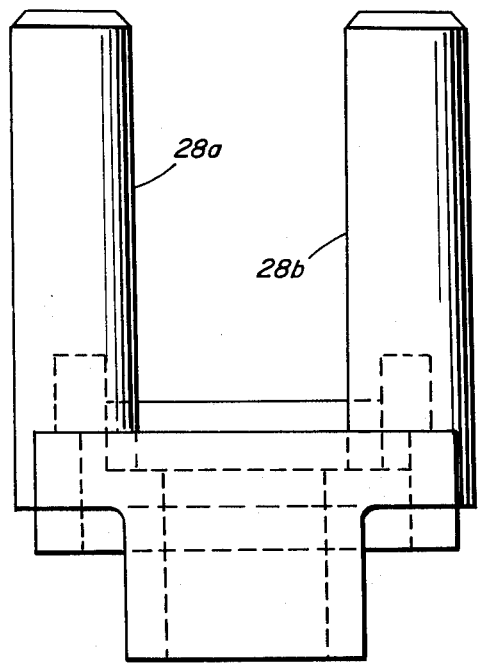
Figure 2C:
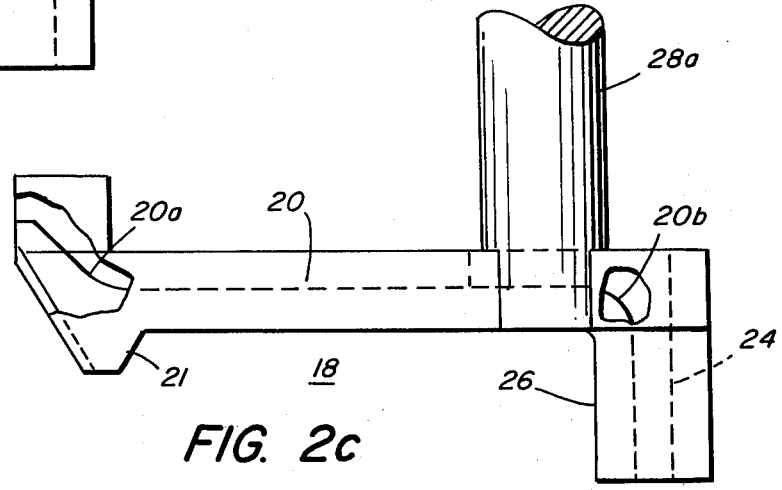

A capillary member support bracket 18 is shown best in FIGS. 2a through 2c and comprises a main body portion 22 having a shallow recess 20 along the upper surface of body portion 22. The rear right hand portion of recess 20 communicates with a vertically aligned rectangular slot 24 provided in the downwardly depending portion 26 integrally joined to body portion 22. A curvature is provided at 20b which communicates with the recess 20 and rectangular shaped slot 24.

The forward or left hand end of recess 20 is provided with upwardly curved surface 20a. A pair of upwardly extending cylindrical shaped projections 28a and 28b extend upwardly from main body portion 22 and are adapted to be received within a pair of cooperating openings 12d and 12e provided in nose cone 12. The underside of capillary member support bracket 18 is provided with a truncated substantially V-shaped projection 21.

As can best be seen from a consideration of FIGS. 2a through 2c, 1b and 1d, the capillary member 30, which is formed of a suitable porous material such as a polyester material, is provided with an enlarged width head portion 30a having a slit 30b. The remaining portion 30c of capillary member 30 is of a narrower width than portion 30a.

Portion 30a of capillary member 30 is positioned against the front surface of jewel bearing 16. The narrow portion 30c is bent to conform to the curved configurations 20a, 20, 20b and 24 of bracket member 18, wherein the portion 30c of capillary member 30 is arranged so as to have a downwardly extending section 30c-1 extending through opening 24 and having its lower end extending a spaced distance beyond the lower edge 26a; a section 30c-2 resting upon the surface of recess 20; and a portion 30c-3 resting upon the surface of 20a. The underside of nose cone 12 (see also FIG. 7b) is contoured to cooperate with capillary member support bracket 18 to sandwich sections 30c-2 and 30c-3 therebetween.

Main portion 30a of capillary member 30 is maintained against the jewel bearing 16 by means of a thin gauge metallic shield 32 having a central portion 32a provided with an oval shaped slot 32b surrounding the slit 30b in capillary member 30. The upper end of shield 32 is bent at 32e and 32f to form a section 32p which bears against the diagonal surface 12a provided along the upper surface of nose cone 12. Ears 32g and 32h extending outwardly and downwardly from section 32p embrace the side portions of the nose cone immediately adjacent diagonally aligned surface 12a.

Figure 1A:
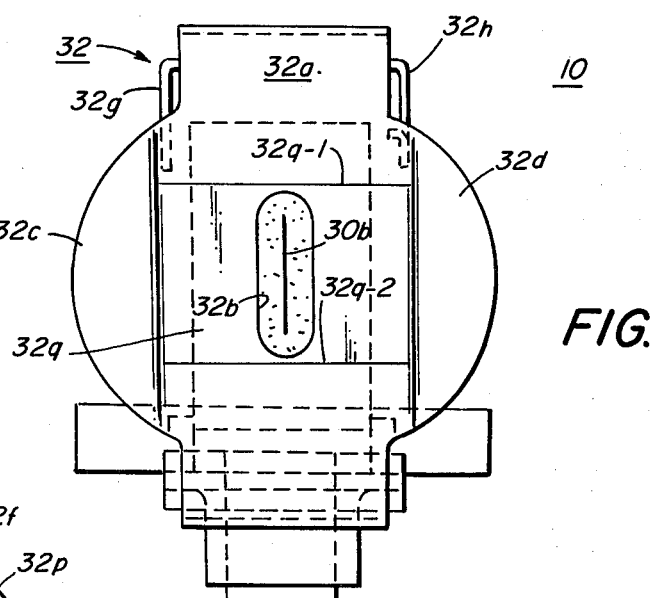
FIG. 1a shows a front elevational view of a print head assembly employing the ink delivery system utilized in the present invention.

Shield 32 is further provided with a bend at 32i and 32j to form diagonally aligned portions 32k and 32m which embrace the truncated V-shaped projection 21 provided along the underside of capillary member support bracket 18. Thus shield 32 is snapped into position and is retained in the mounted position by engagement of surfaces 32p and 32m with surface 12a and truncated V-shaped projection 21, ears 32g and 32h preventing the shield from experiencing any movement toward the left or right relative to the nose cone 12 as shown in FIG. 1a. The projections 28a and 28b of capillary member support bracket 18 are inserted into openings 12e and 12d and act to positively position and align bracket 18 relative to nose cone 12 while shield member 32 serves as the one and only means needed to retain the bracket 18 upon the nose cone 12, eliminating the need for conventional fastening members.

The front surface 32a of shield 32 is provided with a shallow recess 32q which extends across the central portion of shield 32 and is defined by upper and lower eges 32q-1 and 32q-2. The shallow recess 32q prevents ink previously transferred to a paper web (not shown) by print wires 14 from being transferred back to the front surface of shield 32 to cause smudging or smearing of the ink. Rearwardly extending side surfaces 32c and 32d of shield 32 serve as paper smoothers to smooth out any bulges or unevenness in the paper web being printed upon as the reciprocating print head moves across the paper web during printing, said movement being conventional in printers of this type.

Section 30c-1 of capillary member 30 extends into an ink supply container C adapted to deliver ink directly to the print wires 14 by capillary action. The print wires 14, when at rest, have their tips extending beyond the front surface 16a of jewel bearing 16 and into the porous capillary material of section 30a. The forward portions of the print wires 14 extending beyond jewel bearing surface 16a extend into slit 30b, so that the ink is directly delivered from the ink supply container C through capillary action by capillary member 30 to the forwardmost portion of the print wires 14, as well as the forward printing tips thereof. When the print wires electromagnets (not shown for purposes of simplicity) utilize to activate the print wires 14 are energized, the print wires 14 are rapidly accelerated to impact a paper web (not shown for purposes of simplicity) and transfer ink collected upon the printing tip to the paper web, the shape of the ink transferred to the paper web being defined substantially by the cross-sectional configuration of the print wires, which shape is typically circular, but may be any other desired shape.

Figure 3A:
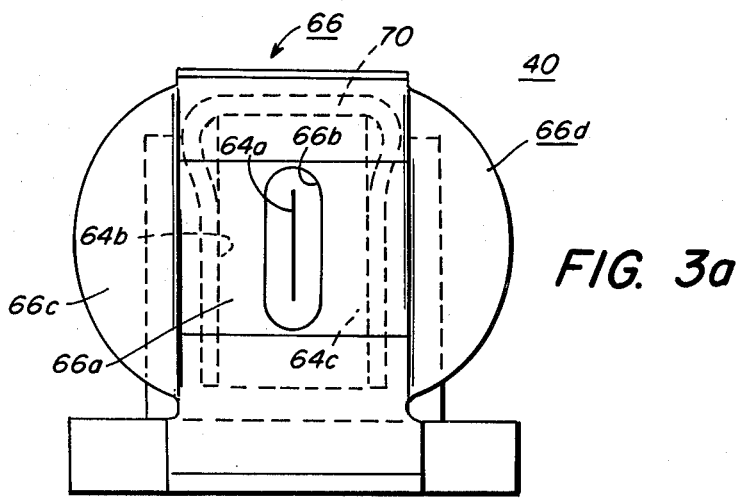
FIG. 3a shows another alternative embodiment of an ink delivery system of the present invention showing a front elevational view thereof.
Figure 3B:
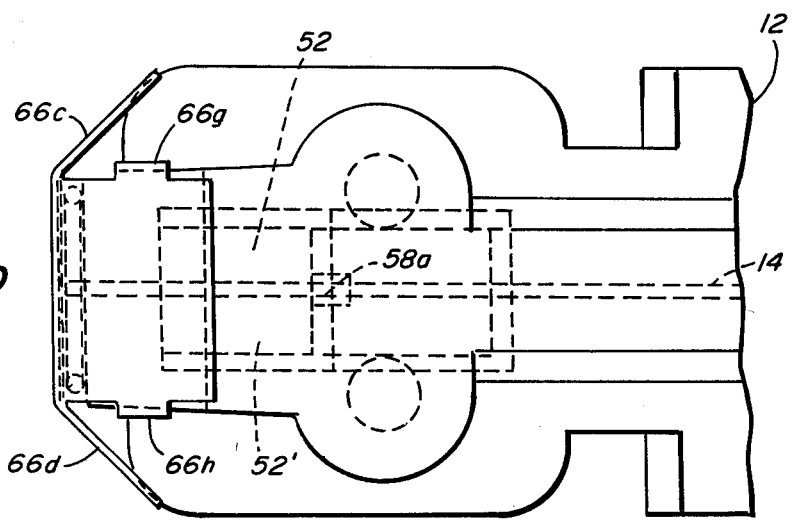
Figure 3C:
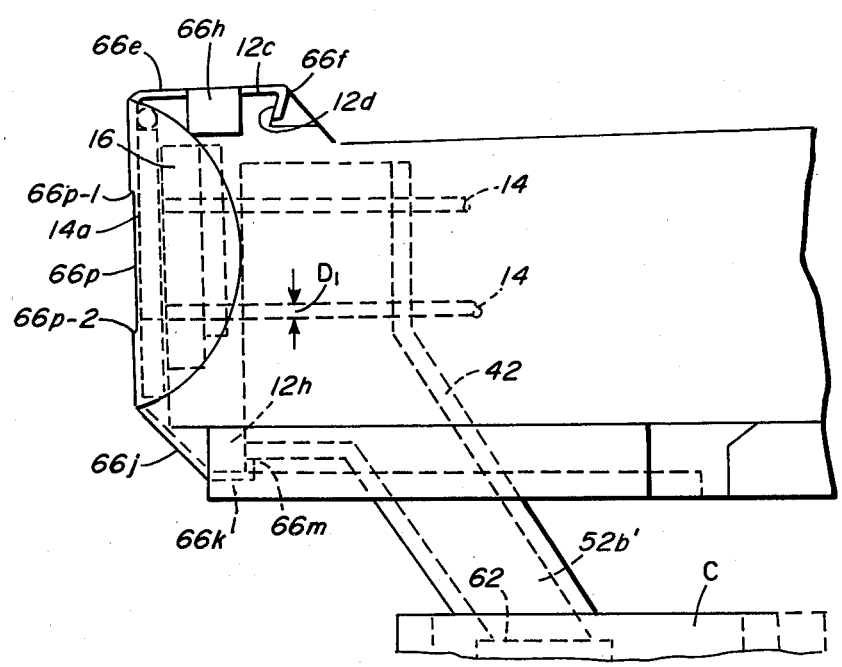

Another technique for delivering ink to a print wire array is shown in the embodiment 40 of FIGS. 3a through 3c, further components of which are shown in detail in FIGS. 4a through 6c.

The embodiment 40 is comprised of a nose cone 12 substantially identical to that described hereinabove in connection with the embodiment 10 of FIGS. 1a through 1c. The nose cone 12 is provided with a jewel bearing 16 for supporting and aligning print wires 14 along an imaginary vertical line, as is conventional. The underside of the nose cone 12 is provided with an opening for receiving and supporting a capillary member support bracket 42, shown best in FIGS. 6a through 6c, as comprising a pair of vertical sides 44 and 46 each having an upper, substantially rectangular shaped portion 44a, 46a and a lower, diagonally aligned portion 44b, 44b, the forward and rearward edges of sections 44b and 46b being integrally joined to diagonally aligned surfaces 48 and 50 respectively, forming a hollow, rectangular shaped diagonally aligned passageway 52 whose upper open end communicates with the hollow region between upper sidewall sections 44a and 46a. A pair of capillary members 52, 52' are positioned within capillary member support brackets 42, one of said capillary members 52 being shown in detail in FIGS. 5a and 5b, and comprised of an upper generally rectangular shaped section 52a and a lower, elongated diagonally aligned section 52b, the sections 52a and 52b generally conforming to the shape of sections 44a and 44b of the capillary member support bracket 42.

Two such capillary members, identified as members 52 and 52' shown in dotted line fashion in FIG. 6b, are positioned within the capillary member support bracket 42, the upper rectangular portions 52a and 52' arranged within the hollow region between upper wall portions 44a and 46a, while the lower, elongated diagonally aligned portions 52b and 52b' are arranged within the hollow passageway 51.

The region between the left-hand edges of walls 44a and 46a is open as shown at 56 in FIG. 6c, while the region across the right-hand edges of upper wall portion 44a and 46a is bridged by a rear wall 58, having an elongated slot 58a.

The capillary member support bracket 42 is shown in the operative position in FIGS. 3a through 3c, with the lower ends 52b, 52b' of the capillary members 52 and 52' extending beyond the lower end of bracket 42 and engaging a capillary member 62 provided within ink supply container C.

The print wires 14 are positioned between the capillary members 52 and 52' and further extend through slot 58a which provides adequate clearance for free, reciprocating movement of the print wires 14 without in any way interfering with their normal operation.

The gap distance D between the confronting surfaces of capillary members 52 and 52', as shown best in FIG. 6b, is less than the diameter D1 of print wires 14 to provide sliding engagement between print wires 14 and capillary members 52, 52' to assure that ink delivered from ink supply container C upwardly through capillary members 52 and 52', is caused to be transferred to the sides of print wires 14 by wiping engagement.

The ink delivered to the sides of print wires 14 migrates along the print wires 14 toward the forward end or nose cone 12 passes by capillary action and through the openings provided in jewel bearing 16, causing the ink to be transferred to both the forward tips 14a of the print wires as well as being transferred to the front capillary member 64, which, as shown in FIGS. 4a and 4b, is a thin substantially rectangular shaped member having an elongated slit 64a. Capillary member 64 is maintained in position upon the front face of nose cone 12 and covering the front surface of jewel 16, by means of shield 66, which, similar to shield 30 in the embodiment of FIGS. 1a through 1c, is comprised of a front surface 66a having an oval shaped opening 66b surrounding slit 64a in capillary member 64. Shield 66 is provided with a pair of paper smoothing flanges 66c and 66d bent diagonally rearwardly and adapted to smooth any bulges or unevenness in the paper web.

Nose cone 12 is provided with an upper surface portion 12c and shoulder 12d which function to receive top portion 66e and downwardly bent portion 66f of shield 66. The pair of downwardly depending ears 66g and 66h extend a short distance downwardly along associated side surface portions of nose cone 12 to prevent any movement of the shield in a direction transverse to the longitudinal axis of print wires 14.

Shield 66 is further provided with portions 66j, 66k and 66m which serve to embrace a downwardly depending projection 12h provided along the underside of nose cone 12, in order to snap fit shield 66 to nose cone 12 and hold the forward edge of capillary support bracket 42 in place within the nose cone 12.

Figure 1B:
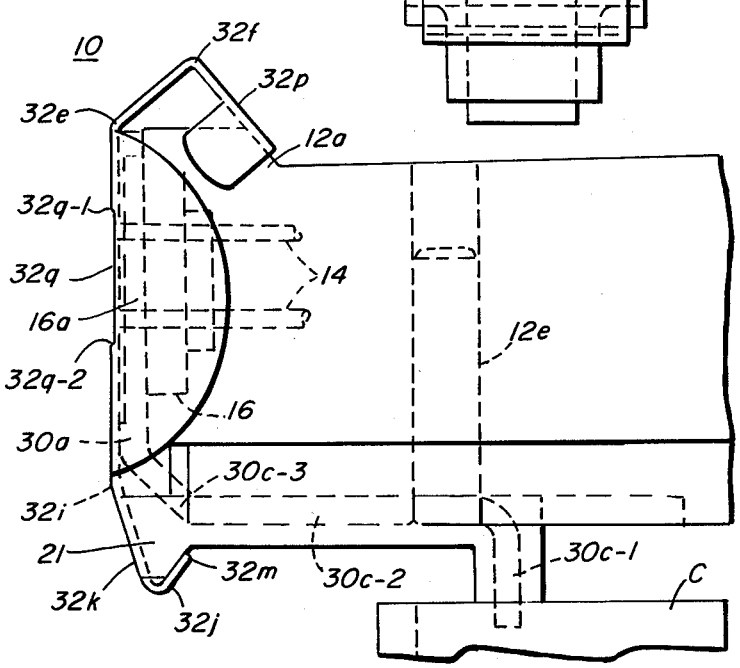
Figure 1D:
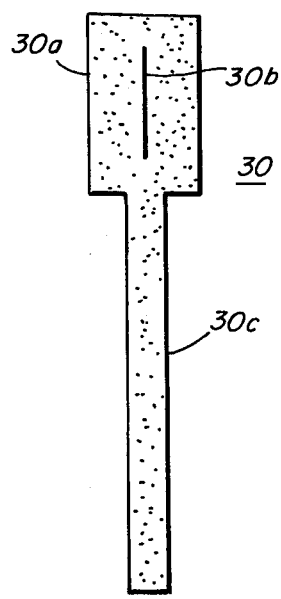
Figure 1C:
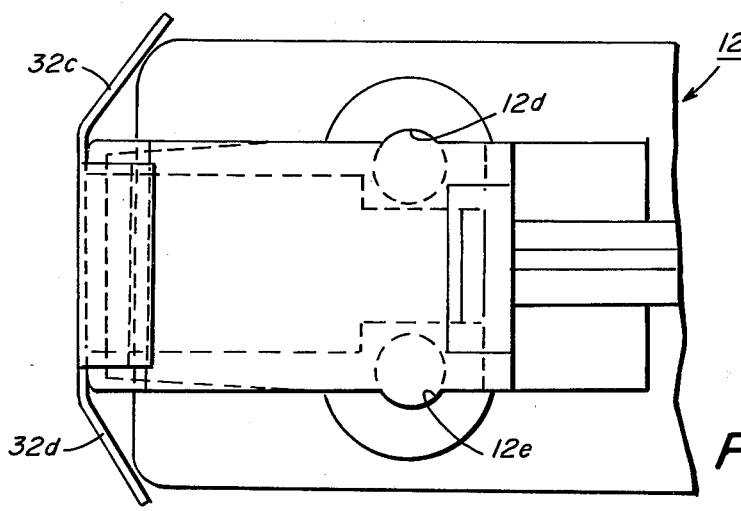

Shield 66 is further provided with a shallow recess portion 66p having upper and lower edges 66p-1 and 66p-2, recess 66p functioning in a manner similar to recess 32q of FIGS. 1a through 1c to prevent the smudging or smearing of ink previously transferred to the paper web upon which printing occurs.

Since the capillary member 64 is subjected to some wearing due to the constant reciprocating movement of the print wires 14 within slot 64a, the embodiment 40 of FIGS. 3a through 3c may be provided with a substantially U-shaped spring member 70 adapted to embrace the top edge and left and right-hand edges of member 64 and to exert an inwardly directed force along both the left and right-hand edges 64b and 64c of capillary member 64 to compensate for any wearing in the region of slit 64a to normally urge the capillary material on opposite sides of slit 64a toward the center of capillary member 64 to assure that capillary member 64 makes good wiping engagement with the print wires 14.

In operation, ink is delivered from the ink supply container C through the ink supply container wick 62 and the print head wicks 52 and 52' upwardly by capillary action to the sides of print wires 14. The ink migrates along the print wires and to the left (relative to FIG. 3c) where it passes by capillary action through the openings in bearing 16 and serves to saturate capillary member 64, especially in the immediate region of slit 64a through which the print wires 14 extend. The forward capillary member 64 serves as an intermediate ink supply reservoir and further serves as a means for evenly regulating and dispensing ink to the printing tips of print wires 14. Member 64 is maintained against the front face of jewel bearing 16 by shield 66 which may be easily removed and replaced as described hereinabove. The position of the print wire tips when at rest is the same as that described with reference to the embodiment of FIGS. 1a to 1c.

Figure 7A:
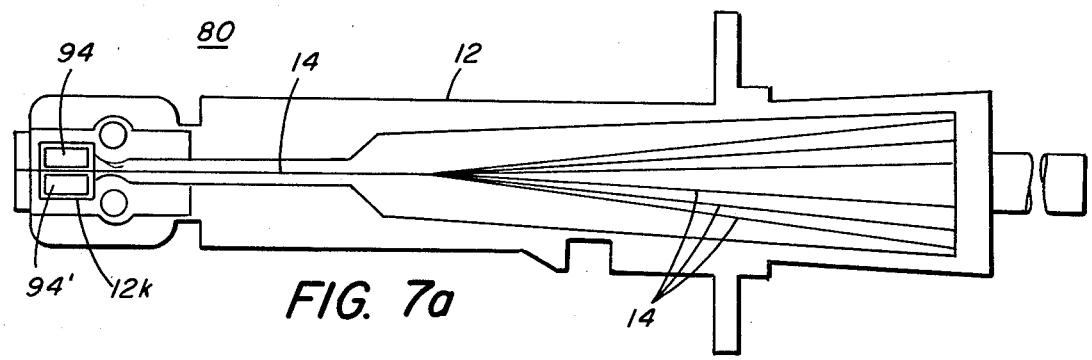
FIGS. 7a and 7b show top and side elevational views respectively of a print head nose cone incorporating still another alternative embodiment of the ink delivery system of the present invention.
Figure 7B:
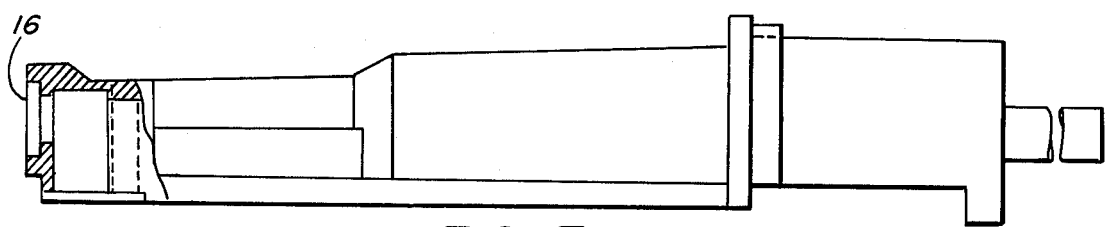
Figure 8A:
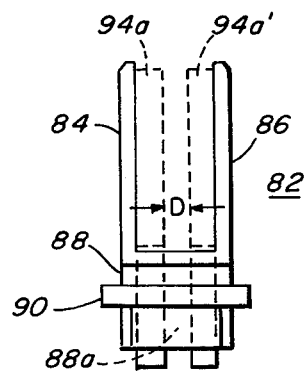
Figure 8B:
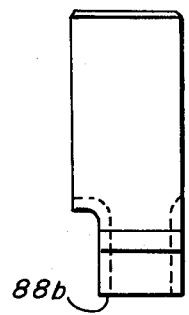
Figure 8C:
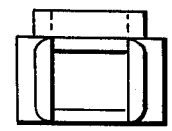
Figure 9A:
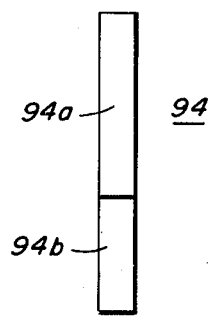
Figure 9B:
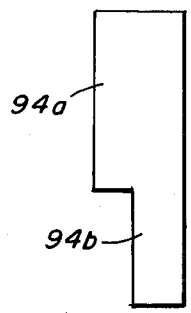

Still another embodiment 80 of the present invention is shown in FIGS. 7a through 9b in which nose cone 12 is provided with a substantially rectangular shaped opening 12k for receiving and supporting a capillary member support bracket 82 shown best in FIGS. 8a through 8c. Support bracket 82 is provided with a pair of spaced sidewall portions 84 and 86 joined to a hollow, rectangular shaped section 88 having a rectangular shaped flange 90 extending therearound and having a hollow opening 88a extending therethrough and communicating with the open region between sidewalls 84 and 86. A pair of capillary members 94 and 94' (see FIG. 7a) are arranged within the capillary member support bracket 82. One of said capillary members 94 is shown in detail in FIGS. 9a and 9b and is comprised of a thin substantially rectangular shaped member having a cutaway or notched portion forming an upper section 94a of enlarged width and a lower section 94b of reduced width. The two capillary members 94 and 94' are inserted into the capillary member support bracket 82 from the upper end thereof (relative to FIGS. 8a and 8b) so that the lower portions 94b and 94b' of reduced width extend into the hollow rectangular portion 88a and so that the upper larger width portions 94a and 94a' are positioned between sidewalls 84 and 86 of capillary member support bracket 82. As was described hereinabove, the gap distance D between capillary member portions 94a and 94a' is less than the diameter of print wires 14. As shown best in FIG. 8a, the lower ends of narrow diameter sections 94b and 94b' extend below the lower edge 88b of hollow rectangular section 88 so as to be free to be inserted into an ink supply container (not shown for purposes of simplicity), and either engage a capillary member (not shown) within the ink supply container or directly engage the ink contained therein in order to deliver ink from the ink supply container through capillary members 94 and 94' to the sidewalls of print wires 14 which are positioned between capillary members 94 and 94' so as to be wipingly engaged thereby in order to transfer ink to the print wires 14. Ink transferred to the sides of print wires 14 migrates towards the forward end of nose cone 12 and passes through the openings in the jewel bearing 16 by capillary action so as to collect upon the tips of the print wires 14. In the embodiment of FIGS. 7a through 9b, the print wires when at rest are arranged such that the printing tips are positioned slightly inwardly of the front surface of jewel bearing 16, as opposed to the arrangements described hereinabove in connection with FIGS. 1a through 1c and FIGS. 3a through 3c. Thus, in the embodiment of FIGS. 7a through 9b, the front capillary member is omitted.

In order to significantly improve the wearing life of the capillary members 94 and 94', the modified embodiment of FIG. 10 may be employed. The embodiment of FIG. 10 utilizes an elongated narrow strip of a suitable absorbent material having good wearing properties, such as nylon, said strip being bent to form a U-shape member 102, shown best in FIG. 10b. Strip 102 is positioned with its center portion 102a engaging the bottom most print wire 14 and with its arms 102b and 102c extending downwardly along the sidewalls of print wires 14 and having its outer surfaces engaging the confronting surfaces of capillary members 94 and 94', shown best in FIG. 10. The capillary member 104 provided in ink supply container C shown in FIG. 10 may, for example, be formed of a pressed cellulose acetate material in the shape of an elongated cylinder as shown best in FIG. 10a. If desired, the cylindrical surface of capillary member 104 may be surrounded by a cellophane or other non-porous wrapper 106 causing ink to be delivered through capillary member 104 from the bottom surface, through the body thereof, to the top surface which is in engagement with the bottom portions of print head capillary members 94, 94'. The bottom portion of the wrapper may be removed to assure good flow of ink in the event that the bottom surface of the capillary member 104 is pressed against the floor of the ink supply container C. The ink is conveyed from container C by capillary action upwardly through capillary member 104 and capillary members 94, 94'. The ink passes through the arms 102b and 102c of inverted U-shaped strip 102 where it is deposited upon the sides of print wires 14. Strip 102 is extremely long wearing as compared with capillary members 94, 94', significantly reducing their need for frequent replacing while at the same time providing a material of sufficient porosity to enable ink at a satisfactory flow rate to be passed from capillary members 94, 94' through member 102 to the sides of print wires 14. The strip 102 may also be employed in the embodiment of FIGS. 3a–3c.

FIGS. 11 and 11a show an embodiment 110 for use in printing in a plurality of colors and being comprised of a nose cone portion 112 having openings 112a through 112c for receiving capillary member support brackets 84, 84', 84''. The assemblies 84, 84' and 84'' are substantially identical to that shown in FIG. 10 wherein like elements are designated by like numerals. The capillary members 94, 94' of each assembly 84, 84' and 84'' have their lower ends engaging a capillary member 104, 104' and 104'' respectively, provided in the containers C, C' and C'' respectively, each such container containing ink of a different color, such as for example, the three primary colors. As was described hereinabove, the capillary assemblies 82 are further provided with nylon strips 102, 102' and 102'', each adapted to embrace one of the three arrays of print wires 14, 14' and 14'', as shown in FIGS. 11 and 11a. The forward ends of the print wires are arranged in jewel bearings 16, 16', 16''. Each of the print wires in each of the arrays 14, 14' and 14'' are provided with an associated electromagnet (not shown) coupled to the rearward ends of the print wires. For example, considering three print wire arrays of 8 print wires per array, the print head assembly is provided with 24 separate and independent electromagnets for selectively moving the print wires in any predetermined order and in any sequence, making it possible to print three different colors substantially simultaneously.

By controlling the relative timing of the energization of the electromagnets, it is possible to cause printed dots of different colors to overlap one another to a greater or lesser extent in order to create colors beyond those, for example, of the three primary colors where in a mixing of the primary colors to a smaller or larger extent renders the multi-color multi-array print head capable of creating substantially all the colors within the rainbow, using only the three primary colors. Obviously, any other three colors may be provided in the ink supply containers C, C' and C'' and the color printing may be effected by any desired time sequence of activation of the electromagnets.

Figure 12:
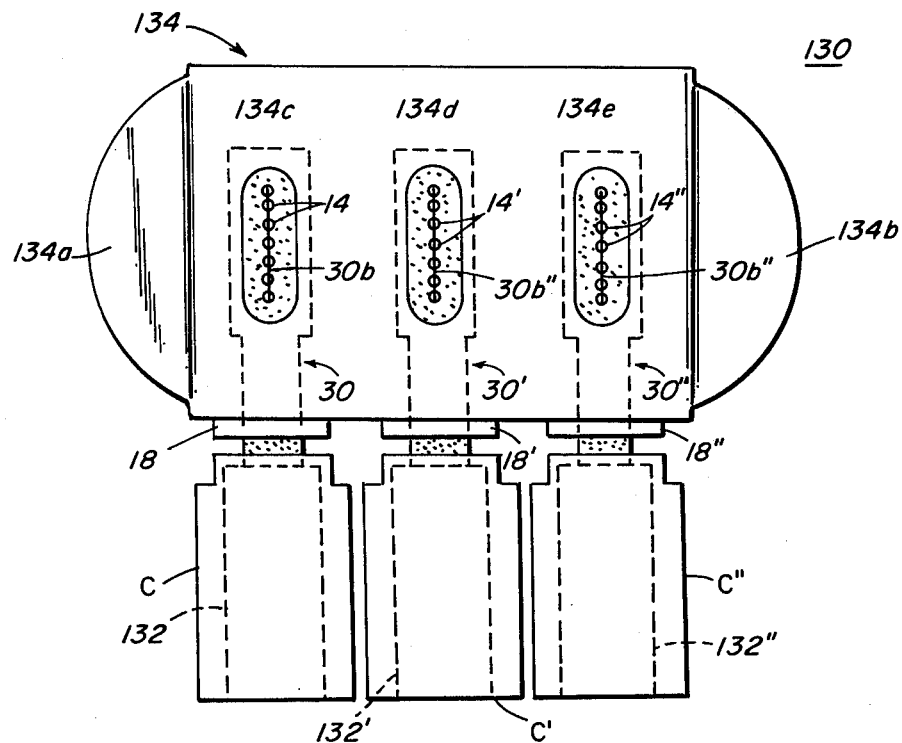
FIG. 12 shows another alternative embodiment for the multiple print wire array print head of FIG. 1 showing a front elevational view thereof.

The color print head employing a direct linking assembly may utilize the apparatus shown, for example, in FIGS. 1a through 1c, wherein the embodiment of FIG. 12 comprises capillary members 30, 30' and 30'', said capillary members being mounted to the print head nose cone by means of brackets 18, 18' and 18'''. The lower ends of capillary members 30, 30' and 30'' are shown as engaging capillary members 132, 132' and 132'' provided with ink supply containers C, C and C''. A single unitary shield 134 similar to shield 32, shown in FIGS. 1a through 1c may be mounted to the nose cone in a snap fitting fashion similar to that described in connection with the shield 32 of FIG. 1a. In a similar fashion, the backwardly bent flanges 134a and 134b serve as paper smoothing means and openings 134c, 134d and 134e serve as the openings for permitting movement of the print wire arrays 14, 14' and 14'' to the paper web (not shown), said print wire arrays extending through slits 30b, 30b' and 30b'' in the capillary members 30, 30' and 30'' respectively.

Figure 13:
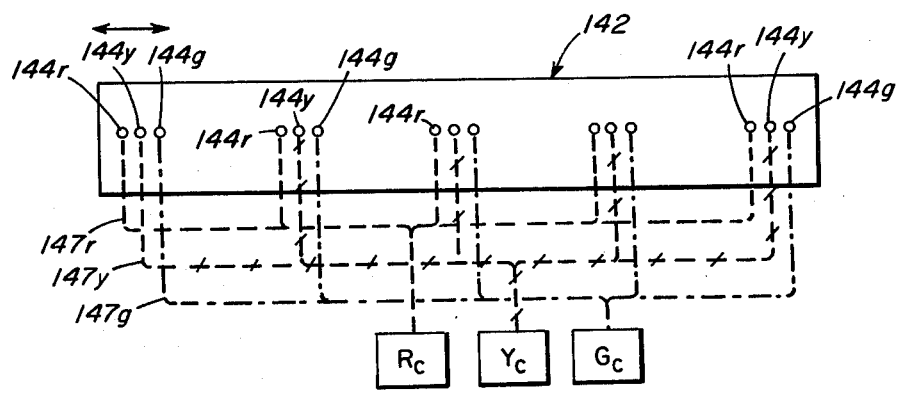
FIGS. 13 and 14 show front and side elevational views respectively of a shuttle bar print having a multi-color printing capability.
Figure 14:
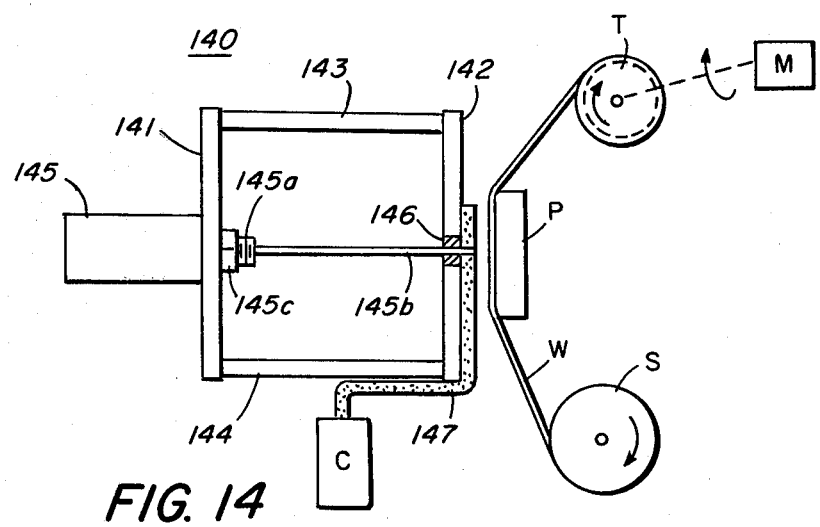

FIGS. 13 and 14 show the techniques of the present invention employed in a shuttle printer 140 which is comprised of a pair of flat elongated plates 141, 142 arranged in spaced parallel fashion and joined to one another by spacers 143, 144. Plate 142 is provided with a plurality of sets of openings 144r, 144y, 144g, arranged across plate 142, also referred to as a shuttle bar. Plate 141 is provided with openings for securing the forward threaded end 145a of a print wire solenoid assembly 145. The print wire 145b extends forwardly and into one of the openings 144 in shuttle bar 142. Nut 145c secures assembly 145 to plate 141. Only one print wire solenoid assembly 145 and its associated mounting has been shown for purposes of simplicity. The forward end of print wire 145b extends through a jewel bearing 146 arranged in opening 144 to provide a low friction bearing for the reciprocating print wire 145b. The tip of print wire 145b extends beyond the front surface of shuttle bar 142 and into a capillary member 147 extending between the front surface of shuttle bar 142 and ink container C.

The entire assembly 140 reciprocates across a paper web W supported by platen P to print in a manner similar to the operation of a cathode ray beam in a conventional television receiver. This technique is described in detail in U.S. Pat. No. 3,833,891 issued Sept. 3, 1974 and assigned to the assignee of the present invention. As an alternative arrangement, the solenoids 145 and plate 141 may be held stationary and shuttle bar 142 may be reciprocated (spacers 143 and 144 should, of course, be eliminated) to cause only the printing ends of the print wires 145b to be reciprocated. This technique is described in detail in U.S. Pat. No. 3,802,544 issued Apr. 9, 1974 and assigned to the assignee of the present invention.

Each set of print wires, associated with the sets of openings 144r, 144y and 144g are adapted to receive ink from an associated container $R_c$, $Y_c$ and $G_c$. The print wires may all be operated simultaneously or may be selectively operated at different firing times. By controlling the firing times, it is possible to cause dots of different colors to be printed in partial or even completely overlapping fashion. Also any one color, more than one color, or all colors may be printed on the said dot row. Dots may be caused to overlap in the vertical direction (assuming movement in the direction shown by arrow 148 to be the horizontal direction) by controlling the movement of the paper web W by motor M for driving web W to be dispensed from supply roll S to takeup roll T.

Additional sets of openings 144 may be provided to accommodate additional colors. Obviously, fewer than three sets of openings may be provided, if desired. FIG. 13 has been limited to showing three sets of openings 144r, 144y and 144g, three containers $R_c$, $Y_c$ and $G_c$ and capillary members 147r, 147y and 147g for delivering ink from their respective containers to the associated print wires. If desired, a container may be provided for each print wire or the number print wires served by a container may be increased or decreased, as desired. Also ink may be delivered directly to the printing tips of the print wires or inwardly from the printing tips as per the embodiments of FIGS. 3 and 10, for example.

Figure 15A:
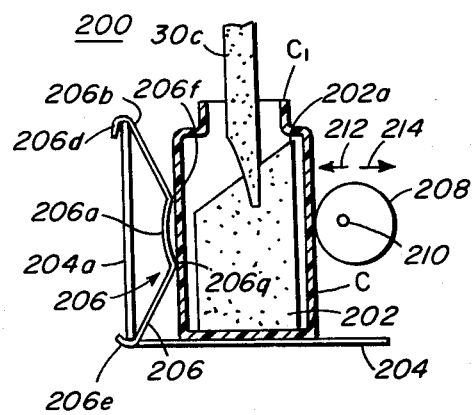
FIG. 15a shows an elevational view, partially sectionalized, of a direct inking means incorporating ink flow regulating means.
Figure 15B:
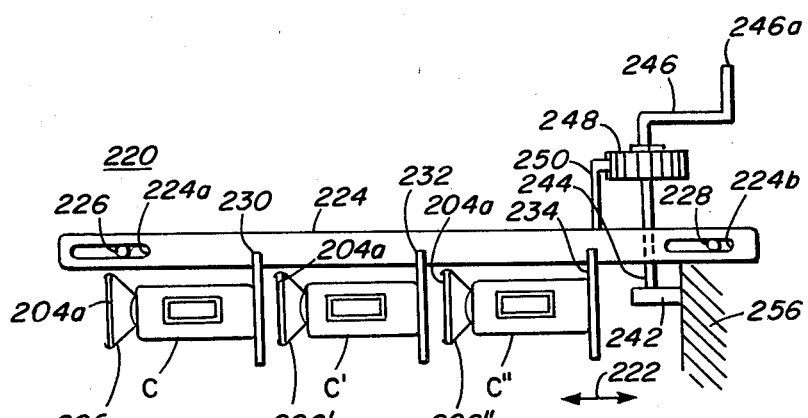

A technique for controlling ink flow rate is incorporated in the embodiments of FIGS. 15a and 15b. As shown in FIG. 15a, ink supply container C is mounted upon a suitable support 204 beneath the print head (not shown) and has positioned within the interior container C, a capillary member 202 having a sloping upper edge 202a. The lower end 30c of the print head capillary member 30 extends into the opening C1 in container C and overlaps a portion of the capillary member 202. Edge 30e is curved as shown to form a tapered lower end. A bracket 204a extending upwardly from support 204 is fitted with a spring 206 having a slightly curved central portion 206a, arms 206b and 206c extending diagonally away from central portion 206a and inwardly bent free ends 206d and 206e embracing the upper and lower edges of vertical support 204a. Points 206f and 206g of spring 206 engage the left-hand vertical sidewall of container C. An eccentric cam 208 rotatable about a pivot 210 and operable by a suitable handle means (not shown) is adapted to control the position of the right-hand edge of container C and moves container C to the left as shown by arrow 212 or to the right as shown by arrow 214, in cooperation with spring 206, by appropriate angular orientation of cam 208. In this manner, the capillary member 202 is moved relative to the lower end 30c of capillary member 30 to control the amount of surface contact therebetween and hence control the flow rate of ink by capillary action across the engaging surfaces of capillary members 202 and 30.

The embodiment of FIG. 15a may be modified in the manner shown in FIG. 15b for a multi-array print head, wherein a flow rate adjustment assembly 220 is provided for adjusting the flow rate of ink to all three print wire arrays by an assembly similar to that shown in FIG. 15a and comprised of vertical walls 204a, 204a' and 204a'', each supporting a spring member 206, 206' and 206'', said spring means each urging their associated container C, C' and C'' in the direction of arrow 222. An elongated arm 224 provided with slots 224a and 224b is arranged to be reciprocally guided by pins 226 and 228 mounted to a stationary member (not shown) and each extending into one of the slots 224a, 224b. Arms 230, 232 and 234 are secured at spaced intervals to elongated member 224 and engage the right-hand sidewalls of containers C, C' and C''. The springs 206, 206' and 206'' urge members 230, 232 and 234 to the right, thereby urging elongated member 224 to the right. An eccentric cam 242 is pivotally mounted on shaft 244 which extends through elongated member 224. An operating arm 246 having an operating handle 246a enables the pivotal rotation of shaft 244. A thumb wheel 248 is mounted upon shaft 244 and cooperates with a resilient detent 250.

By swinging operating arm 246, the cam surface of eccentric cam 242 makes sliding engagement with stationary wall 256 to linearly move elongated member 224 and members 230, 232, 234 either to the left or to the right, which position is maintained by virtue of the spring members 206, 206' and 206''. Each of the containers C through C'' is fitted with a container capillary member 202 of the type shown in FIG. 15a having a sloping upper edge 202a and which capillary member cooperates with the lower end 30c of a print head capillary member 30 to provide ink which flows by capillary action from the container C through capillary member 202 and 30 to the print wires. Moving the capillary members 202 and 30 relative to one another changes the size of the surface area of engagement between these members, thereby regulating the flow rate. By adjusting the cam member 242, the flow rate of ink from all three containers may be regulated simultaneously.

FIG. 16 shows another alternative capillary arrangement which is a modification of that shown in FIG. 1a through 1d and FIGS. 15a and 15b. The embodiment 280 of FIG. 16 is comprised of a snap-on head assembly 282 for being snapped fitted upon the nose of a print head (not shown) and adapted to receive a capillary member 284 having a forward portion 284a with a slit 284b for slidably receiving the print wires therethrough. The forward portion 284a is positioned behind a thin metallic sheet 286 arranged in the front face of member 282.

Member 284 is bent at 284c so that its intermediate portion extends rearwardly. A bend 284e is provided to cause the rearward portion 284f to extend downwardly and through an opening 282b in the base 282a of snap-on member 282. Downwardly depending portion 284f has a tapered side 284g similar to that shown for example, in FIG. 15a and provided for a similar function.

Spring member 288 has a downwardly depending portion 288a arranged to extend through opening 282b and rest against downwardly depending portion 284g of capillary member 284. Intermediate portion 288b extends over openings 282b and 282c in the base portion 282a of snap-on member 282 so that its downwardly depending short portion 288c extends into opening 282c and so that its inwardly directed portion 288d rests against the bottom surface 282d of snap-on member 280. The basic difference between the arrangement of FIG. 16 and that shown, for example, in FIGS. 1a through 1c resides in the fact that the downwardly depending portion 284f is arranged at a right angle relative to the downwardly depending portion 30c-1 of capillary member 30, shown for example, in FIG. 1b.

FIGS. 17a and 17b show a further modification of the capillary assembly in which only a portion of the snap-on member 282 is shown in FIG. 17a for purposes of simplicity. Due to the slight modification, the snap-on member is designated 282' in FIG. 17a and, in place of the openings in the base 282', snap-on member 282' is provided with a slot 282f' in side wall 282e'. Capillary member 284' of FIG. 17a differs from the embodiment 284 in FIG. 16 in that the rearmost portion 284f' extends in a horizontal direction through and beyond slot 282f' as shown best in FIG. 17b and 17c.

Resilient spring member 288' has a portion 288a' extending through opening 282f', as shown best for example in FIGS. 17b and 17c. Intermediate portion 288b' extends along the interior side of sidewall 282e'; portion 288c' extends along the top surface of sidewall 282e' and the outermost portion 288d' extends partially along the outer surface of vertical sidewall 282e'. Resilient spring member 288' is arranged so that its portion 288a' normally urges portion 284f' of capillary member 284' against the upper surface 202a of capillary member 202 which extends out of ink container C. Thus it can be seen that the print head capillary member 284 may assume a variety of different orientations to facilitate sliding engagement with the ink container capillary member and to provide ink flow control arrangements which may be readily adapted to the printer design, in order to take maximum advantage of the printer geometry.

As was mentioned hereinabove, in connection with the multi-color print head design, the preferred embodiments shown for example in FIGS. 11a, 12 and 14, the print head is provided with a plurality of arrays of print wires to provide the unique multi-color printing capability described herein. In order to provide a universal design, but one in which it is possible to provide a variety of different printing capabilities, the print head is designed to incorporate a standard number of print wires, in the present embodiment 24 print wires, for example. The print head is preferably provided with a standard print wire driving section comprised of 24 print wire driving assemblies. The print wires extend forwardly from their associated driving assemblies toward the nose of the print head, which is fitted with a jewel bearing, such as for example the jewel bearing $B_J$ shown in FIG. 11, or the jewel bearing 16 shown in FIGS. 1b and 7b. In the example of the multicolor print head in which three such arrays are provided, the jewel bearings may be individual bearings as shown in FIG. 11, or may for example be a single jewel bearing provided with a plurality of arrays, each such array comprising a plurality of openings adapted to support the printing tips of the print wires and allow free reciprocation thereof at a minimum of wearing. Jewel bearings may, for example, be ruby, sapphire, plastic or a combination thereof.

FIG. 18 shows one arrangement in which the arrays $A_1$, $A_2$ and $A_3$, which may be formed either in a single jewel bearing or in three jewel bearings, are each provided with openings $O_1$ through $O_8$ for positioning and supporting the printing tips 14 of the print wires to provide a low friction bearing arrangement. The arrangement of FIG. 18a provides a jewel bearing in which the 24 print wires are arranged in three arrays of eight print wires each. FIG. 18b shows an alternative arrangement wherein two arrays $A_1$ and $A_2$ are provided, in either a single jewel bearing or a pair of jewel bearings, array $A_1$ having openings $O_1$ through $O_{12}$ each adapted to position and support a print wire tip 14. Array $A_2$ is provided with openings $O_1'$ through $O_{12}'$ each adapted to receive the printing tip 14 of a print wire. The openings $O_1$ through $O_{12}$ are staggered, i.e., offset, relative to openings $O_1'$ through $O_{12}'$ to permit the printing of overlapping dots. The embodiment of FIG. 18b provides another arrangement for the same number of print wires (24).

FIG. 18c shows still another arrangement in which one, two or as many as five jewel bearings may be utilized to provide the five arrays $A_1$ through $A_5$ wherein arrays $A_1$ and $A_2$ are each provided with openings $O_1$ through $O_6$ and $O_1'$ through $O_6'$ respectively, which are staggered in a manner similar to the openings in array $A_1$ and $A_2$ of FIG. 18b.

Array $A_3$ through $A_5$ are each provided with openings $O_1''$ through $O_4''$, $O_1'''$ through $O_4'''$ and $O_1''''$ through $O_4''''$, the openings in arrays $A_3$, $A_4$ and $A_5$ being staggered in a manner similar to the openings of the arrays $A_1$ and $A_2$ of FIG. 18c and FIG. 18b.

In the embodiment of FIG. 18b, the arrays $A_a$ and $A_2$ may be employed for printing in only a single color such as, for example, black, by delivery of liquid ink of the single color in any of the manners taught hereinabove. Alternatively, different colored inks may be delivered to the print wires of arrays $A_1$ and $A_2$.

In the embodiment of FIG. 18c, arrays $A_1$ and $A_2$ may receive the same color ink (for example, black) while arrays $A_3$ through $A_5$ may receive ink of one of the three primary colors. Alternatively, arrays $A_1$ and $A_2$ may receive ink of different colors from one another and colors which differ from the inks delivered to arrays $A_3$ through $A_5$. Thus in the embodiment of FIG. 18c, the printing of as many as five different colors may be provided or the head may alternatively be provided to print in black only through the use of arrays $A_1$ and $A_2$ while printing in the primary colors through the use of arrays $A_3$ through $A_5$ and, in addition, enable the mixing of the primary colors to develop any other color of the rainbow by overlapping the dots printed upon the print receiving medium.

FIGS. 19 through 23 collectively show still another arrangement of the present invention for mounting, aligning and selectively moving an ink container (or containers) to adjust the position of its capillary member relative to the capillary member carried by the print head in order to regulate rate of flow of ink to the print wires.

FIGS. 19a through 19e show views of an ink container 300 which may be employed for providing ink to each print wire array and which is substantially in the shape of a rectangular parallelepiped having a floor 302, sidewalls 304a through 304d and a top 306 which collectively form housing 300.

Top 306 is provided with an opening 306a defined by interior walls 308, 310 and 316 collectively cooperating with sidewall 304. Walls 304d, 310 and 316 are substantially vertical while wall 308 extends inwardly at 312 and then downwardly at 314, reducing the size of opening 306a to narrower opening 306b. Opening 306b receives a capillary member (not shown) which extends the interior surface of floor 302. Walls 310, 314 and 316 have a lower edge which terminates a spaced distance above floor 302 exposing the bottom portion of the capillary member to the ink within the container.

The interior of container 300 is substantially divided in half by vertical wall 318 which likewise terminates the same predetermined distance above floor 302 as walls 310, 314 and 316. Wall 318 serves to reduce the amount of sloshing experienced by the ink as the container is moved back and forth during the printing operation.

The interior of top 306 is provided with a reinforcing rib 20 which extends to the left from interior wall 318 (relative to FIG. 19a) and terminates at a point just to the right of opening 322 which is surrounded by threaded cylindrical portion 324 adapted to threadedly receive enclosure cap 324' for sealing opening 322, which serves as an air hole to permit the entry of air through opening 322 into the interior of housing 300 to replace the liquid ink dispensed from container 300 by capillary action as was previously described hereinabove.

The central portion of top 306 is provided with an elongated substantially V-shaped groove 326, shown best in FIGS. 19a and 19d, which groove is adapted to receive the projection of a swingable arm (to be more fully described) which serves to accurately position the container 300 upon the carriage supporting the container and the print head.

The top surface 306 is further provided with a rectangular shaped surface portion 328 shown best in FIGS. 19a and 19c to provide clearance for the locating and positioning lever to be more fully described. FIGS. 20a through 23 show the container adjustment assembly 400 which is comprised of a mounting bracket 402 shown best in FIGS. 23 and 21a through 21c. Bracket 402 is comprised of lower portion 402a provided with openings 402b and 402c for receiving threaded fastening members to secure the lower end of bracket 402 to a carriage assembly 404, a portion of which is shown in FIG. 7b, said carriage assembly being provided with a recess 406 for receiving a resilient leaf spring element 408 having a configuration substantially identical to leaf spring 206 shown in FIG. 15a, so as to engage the lower surface 302 of ink container 300 shown in dotted fashion in FIG. 1b.

Mounting bracket 402 has a portion 402d extending diagonally from portion 402a and provided with opening 402e for receiving the portion 410a of lever supporting shaft 410 shown in FIG. 22. Bracket 402 is bent as shown at 402f so that its portion 402g, although arranged parallel to portion 402d, is displaced from the plane containing portion 402d, as can best be seen in FIG. 21c. The upper end of bracket 402 is bent at 402h to form inwardly directed portion 402j having slot 402k defined by two staircase-shaped edges 402m and 402n and two straight parallel edges 402p and 402q.

Bracket 402 supports shaft 410 which in turn swingably supports lever 412 in a cantilevered fashion.

Lever 412 is shown best in FIGS. 20a, 20b and 23 and is comprised of an upright arm portion 412a having an upper free end 412a-1 which may be gripped by the fingers of an operator to position lever 412 in a manner to be more fully described.

Upright arm 412a is provided with an opening 412g for receiving shaft 410 so that its reduced diameter portion 410d is received with an opening 412g.

Lever 412 is bent at 412b to form a horizontal bridging portion 412d bent upwardly at 412e to form upright portion 412f having opening 412g' and is bent at 412h to form upright section 412i which, in turn, is bent at 412j to form a horizontally aligned portion 412k, whose free end is bent at 412m to form the downwardly depending projection 412n.

Shaft 410 extends through openings 412g-412g' and further extends through opening 402e in bracket 402 whereby its threaded portion 410a is threadedly engaged with nut 411 to firmly secure shaft 410 to bracket 402. A C-clip 413 is snap-fitted within groove 410c and is positioned to the right of upright portion 412f to prevent lever 412 from experiencing any movement in the axial direction of shaft 14. However, lever 412 is free to swing about shaft 410 into the slidable engagement between shaft 410 and the openings 412g-412g'.

Lever 412 is preferably formed of a resilient, metallic material which is capable of flexing. The outer surface of the lower portion of upright 412a rests against the adjacent surface of bracket 402. The position of slot 402k relative to the lower end of lever arm 412 is such that the arm 412a is under constant flexure. The natural resiliency of arm portion 412a tends to urge the arm in the direction shown by arrow 414. The length L of the top portion 412a-1 of arm 412a relative to the opening 402k is such that arm 402a is capable of being retained in any one of five positions within slot 402k. Noting, for example, FIG. 23, arm portion 402a-1 is shown resting against surface 402p, causing lever portion 402k to be in its downward-most position. In order to adjust arm portion 412a, the arm is moved in a direction of arrow 418 (see FIGS. 21a and 23) until its forward portion abuts against step portion 402m-1. The arm is then swung in a direction shown by arrow 420 until its rearward portion rests against step portion 402n-1. Lever 412 may be released and will be retained in this position, due to the fact that its natural resiliency urges the rearward portion of the arm 412a against step portion 402n-1. Lever 412 may be moved to any one of the remaining positions and be retained in the selected position in a similar manner. For example, assuming that arm 412a is in its right-hand-most position relative to FIG. 21a so that it rests against surface 402q, to move lever 412 to the next position, arm 412a is moved in a direction shown by arrow 422 of FIG. 21a so that its rearward portion is free of step portion 402n-4 at which time, by releasing the arm, its natural resiliency will urge the rearward portion of the arm against step 402n-3. Lever 412 will be retained in this position due to its natural resiliency, as was described hereinabove.

In order to insert, accurately position and adjust an ink container on the carriage assembly, the ink container 300 is positioned above recess 406 so that its floor 302 rests upon leaf spring 408. Container 300 is pressed downwardly so that its top surface passes beneath projection 412n of lever arm 412. When the container 300 is positioned within recess 406 so that its V-shaped groove 326 is beneath projection 412n, container 300 is released whereby spring 408 urges the container 300 upwardly. The sloping walls of V-shaped recess 326 act to guide projection 412n into the recess. The forward curved portion 412n-1 of projection 412n also assists in aligning projection 412n and recess 326 relative to one another. This arrangement assures that the ink container 300 is properly positioned so that its capillary member (not shown) engages the capillary member mounted upon the forward end of the print head. By manipulating lever arm 412 in the manner described hereinabove, the lever arm is caused to swing about shaft 410 to respectively raise or lower ink container 300 so as to adjust its capillary member relative to the print head capillary member in order to regulate the rate of flow of ink to the print wires by capillary action, as was described hereinabove.

Although the lever arrangement is described as regulating capillary flow by either raising or lowering container 300, it should be understood that the assembly may be mounted at right angles to its position as shown in FIG. 23 so as to move the container sideways, for example, in the manner shown in FIGS. 15a and 15b.

The lever arm 412 may, for example, be provided with three downwardly directed projections of the type shown as 412n in FIG. 20b, each adapted to be received by a recess in one of three ink containers whereby the single adjustment of the lever arm will simultaneously adjust the rate of flow of ink between three containers and the print wires associated therewith. Alternatively, separate lever arm assemblies may be provided for each of the ink containers.

The adjustable flow rate assemblies described herein may be utilized to compensate for changes in ambient conditions such as temperature changes which may affect the ink viscosity and printing speeds. For example, any of the flow control devices described herein may be utilized in a variety of printers having different printing speeds with the regulation of ink flow being controlled by adjustment of the flow control means to accommodate printing speeds and thereby be assured that the print wires, regardless of the printing speeds involved, are being supplied with ink at an adequate flow rate.

By utilizing a microprocessor control, it is possible to print effectively all of the colors of the rainbow simply by providing a print head with ink supply containers having ink of the three primary colors. The microprocessor is then programmed to select predetermined delay intervals between the firing of the electromagnets of the three print wire arrays in order to control the amount of overlappage between dots of differing colors in order to create a variety of secondary colors from the three primary colors. Of course, dots of all three color inks may be overlapped with one another for providing a still greater variety of colors which can be printed. The technique allows for the simultaneous printing of colors without any ribbon shifting whatsoever as is required in conventional apparatus, thereby enabling the printing of alphanumeric characters, as well as graphic matter at speeds heretofore capable of being obtained through only a single color printing means.

A latitude of modification, change and substitution is intended in the foregoing disclosure and, in some instances, some features of the invention will be employed without a corresponding use of other features. Accordingly, it is appropriate that the appended claims be construed broadly in a manner consistent with the spirit and scope of the invention herein. For example, the individual support brackets for supporting each capillary member may be joined to form a composite unitary bracket.

What is claimed is:

1. Apparatus for color printing comprising:

at least first and second reciprocating print elements;

first and second ink supply containers each containing ink of different colors;

first and second elongated capillary means, each having a first end extending into said ink supply container and a second end positioned to engage an associated one of said printing members, whereby ink is delivered to the printing face of the first and second printing elements by their associated capillary members to effect printing by transfer of ink from the printing face to a print receiving medium when the printing faces impact the print receiving medium, said printing elements being capable of being operated simultaneously;

each said capillary means comprising:

a first capillary member, having a tapered upper edge, provided in its associated ink container, and a second capillary member engaging at least a portion of said first capillary member and positioned to wipingly engage its associated printing member;

means for normally biasing all of said containers in a first direction;

handle operated means for simultaneously urging all of said containers in a second direction opposite said first direction, to control the size of the area of engagement between said engaging capillary members.

2. The apparatus of claim 1 wherein said handle means further includes eccentric cam means.

3. The apparatus of claim 1 further comprising detent means for retaining said handle means in a predetermined orientation to thereby retain the position to which the capillary members have been moved.

* * * * *